UNITED STATES PATENT OFFICE.

THOMAS SHEEHAN, OF DUNKIRK, NEW YORK.

PROCESS OF MAKING REFINED CAST-STEEL AND OF STEEL-COATING WROUGHT-IRON.

SPECIFICATION forming part of Letters Patent No. 320,819, dated June 23, 1885.

Application filed April 14, 1885. (No specimens.) Patented in England June 8, 1883, No. 2,862.

*To all whom it may concern:*

Be it known that I, THOMAS SHEEHAN, a citizen of the United States, and a resident of Dunkirk, in the county of Chautauqua and State of New York, have invented certain new and useful Improvements in an Improved Process of Making Refined Cast-Steel and of Steel-Coating Wrought-Iron; and I do hereby declare that the following is a full, clear, and exact description thereof.

The object of my invention is to produce an improved process and method of making refined steel from inferior wrought-iron or the best quality of wrought-iron.

In order to carry out my invention I prepare twenty (20) tons of wrought-iron for the crucible in the following way: I take a tank that will contain two hundred and fifty gallons of water. After the said tank has been filled or partially filled with water I throw in about one hundred and ten pounds of chloride of sodium, eighty pounds of bicarbonate of soda, seventy pounds of bisulphite of soda, forty pounds of sulphate of zinc, to dissolve, and to be kept as a supply for future use. I then take another but smaller tank, which will hold about six bushels of pulverized hardwood charcoal. I then take as much liquid out of the large or first-mentioned tank as will saturate the charcoal to the consistency of a stiff paste. It is then ready for use. The two aforementioned tanks are to be made of sheet-iron one-quarter of an inch thick, and to be made steam or water tight. I then take a box, made of cast-iron, of the following dimensions: five feet long, six inches wide, eight inches deep. The thickness of the material used shall be five-eighths of an inch. The above is the inside measurement. Then I take broken limestone and put a layer of one inch thick in the bottom of said box. I then put a thin plate of sheet-iron, about one-sixteenth of an inch thick, on the top of the limestone. This plate of iron has a slit cut lengthwise through the middle about one inch wide, the object of which is to save the compound from mixing with the lime when burned. Then I prepare wrought-iron for the crucible in the following manner: I take scrap-iron, as well as new bar-iron, irrespective of their qualities, and hammer them one-quarter of an inch in thickness, irrespective of the shape when flattened; then I put alternate layers of the compound and the iron in said box, and cover and lute the same. I then put six of the said boxes in a suitable furnace and leave them there under a strong heat for ten hours, after which time I take them out and let them cool before opening.

By this process I will have good steel, fit for shop tools of every description, also every description of cutlery, surgical instruments, also superior files, taps, and dies, also sword blades equal to the old Damascus steel, when properly tempered. The reason for this is that the crucible is free from phosphorus and sulphur.

I use an oscillating ingot-machine for stirring and agitating the liquid steel until it becomes cool or stiff in the ingot before removing the contents; then the steel will be compact and free from blow-holes and flaws, and be of uniform quality.

I do not confine myself to any particular construction of machine; hence I do not describe any.

My process can be utilized for agricultural machinery—such as plows, harrows, &c.—with great advantage by making an alteration in the chemicals—that is to say, I use chloride of sodium, bicarbonate of soda, bisulphite of soda, and sulphate of zinc, reduced one-quarter by weight of each ingredient. It will then answer the same purpose as the old method of case-hardening, but with greater advantages, and produce a better quality of steel.

Having thus described my invention, I desire to claim—

The process of making refined steel from wrought-iron, which consists in packing the wrought-iron in an annealing-box, in a compound of charcoal, chloride of sodium, bicarbonate of soda, bisulphite of soda, sulphate of zinc, substantially in the proportions described, and employed in conjunction with broken limestone, and subjecting the boxes to heat, substantially as set forth and described.

In testimony that I claim the foregoing, I have hereunto set my hand this 18th day of March, 1885.

THOMAS SHEEHAN.

Witnesses:
DAVID R. McKEE,
J. O'CONNELL.